United States Patent [19]
Muterel

[11] 3,972,192
[45] Aug. 3, 1976

[54] TANDEM MASTER CYLINDER

[75] Inventor: Roland Muterel, Bessan Court, France

[73] Assignee: Societe Anonyme D.B.A., Paris, France

[22] Filed: Nov. 26, 1975

[21] Appl. No.: 635,529

Related U.S. Application Data
[63] Continuation of Ser. No. 503,021, Sept. 3, 1974, abandoned.

[30] Foreign Application Priority Data
Sept. 11, 1973 France .............................. 73.32564

[52] U.S. Cl. .................................. 60/562; 60/591; 188/106 P; 188/151 A; 188/345; 303/6 C
[51] Int. Cl.² ......................................... B60T 11/20
[58] Field of Search ............ 188/106 P, 151 A, 345, 188/349; 60/362, 565, 591, 582; 303/6 C

[56] References Cited
UNITED STATES PATENTS
3,525,552  8/1970  Oberthur ........................ 188/345 X
3,686,864  8/1972  Shutt .................................... 60/582
3,729,237  4/1973  Ishikowa et al. .................. 303/6 CX

*Primary Examiner*—George E. A. Halvesa
*Attorney, Agent, or Firm*—Leo H. McCormick, Jr.; William N. Antonis

[57] ABSTRACT

The invention relates to a tandem master-cylinder for a split braking system of an automotive vehicle. The master-cylinder comprises two pressure chambers, the first one between the control piston and the floating piston and the second or front chamber before the floating piston. The first chamber communicates with a first outlet port which is connected to a second outlet port through a by-pass valve. The by-pass valve is secured to a tappet-rod projecting into the second chamber to be engaged by the floating piston, upon pressure failure in the second chamber and so that the by-pass valve is opened. The first outlet port is adapted to be connected to a set of brake actuators through a braking correcting valve while the second outlet port is adapted to be directly connected to said set of brake actuators.

2 Claims, 1 Drawing Figure

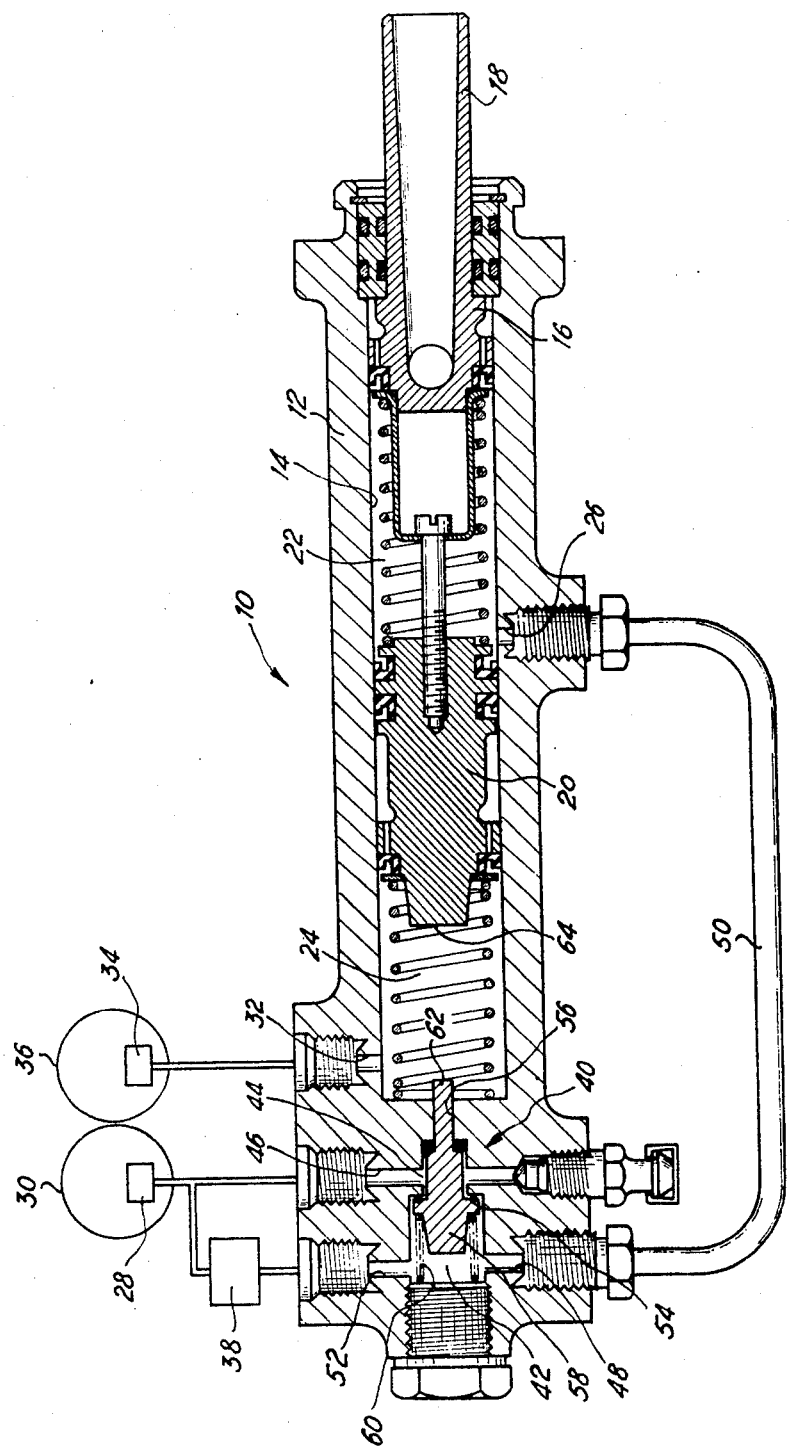

TANDEM MASTER CYLINDER

This is a continuation, of application Ser. No. 503,021, filed Sept. 3, 1974, now abandoned.

The invention relates to a tandem master-cylinder for a split braking circuit of a motor vehicle.

Split braking circuits already proposed comprise a tandem master-cylinder of the type having a housing containing a principal bore which slidably receives a controlling piston and a floating piston so as to define therein between the two pistons and between the floating piston and the end of the bore a first and a second pressure chamber separately connected by a first and by a second outlet orifice to a first and to a second set of brake actuators, the first actuator set being connected to the first outlet orifice by way of a braking correcting valve capable of rendering the law of pressure rise in the set of associated actuators different from the law of pressure rise in the first pressure chamber, the circuit also comprising a by-pass valve which is arranged in parallel with the correcting valve and of which the movable valve member is normally urged into an open position in the event of a pressure unbalance between the two chambers due to a pressure reduction in the second chamber.

The by-pass valve is provided for safety reasons. The braking correcting valve is intended to restrict, at least partially, the pressure rise in one of the vehicle's sets of brakes, usually the set associated with the rear wheels of the vehicle, so that these wheels do not lock when the driver brakes hard. If the brake circuit associated with the front wheels of the vehicle fails, however, it is desirable to be able to cancel the effect of the correcting valve, and it is for this reason that the by-pass valve is provided. The movable member of the by-pass valve may, for example, be controlled by a differential piston subject to the pressure prevailing in the two chambers of the master-cylinder.

Since failures in a brake circuit are relatively rare in the life of a motor vehicle, the movable member of the by-pass valve may become stuck to its seat on account of foreign bodies, so that it cannot be released at the decisive moment. Since the effective cross sections of the differential piston which controls the movable member of the by-pass valve are small, for reasons of space, it has been thought advisable, to ensure satisfactory operation of the by-pass valve, to utilize the additional motion of the floating piston in its bore in the event of a pressure reduction in the second chamber of the master cylinder so as to urge the by-pass valve into its open position. According to the invention, the floating piston is connected by a mechanical transmission to the said valve member so that the latter is urged into its open position in the event of a pressure unbalance as defined above.

The effective cross-section of the floating piston is therefore exploited to increase very substantially the pressure opposing the reaction force which results from sticking of the valve. In a preferred embodiment of the invention, the mechanical transmission comprises a tappet sliding through the end of the principal bore and projecting into the second chamber. This very simple arrangement makes it possible to site the by-pass valve in the master cylinder housing and to render the assembly more compact.

The invention will now be described with reference to the single accompanying FIGURE, illustrating diagrammatically a split brake circuit for a motor vehicle comprising a tandem master-cylinder according to the invention shown in longitudinal section.

As the FIGURE shows, the master cylinder 10 comprises a housing 12 containing a bore 14 which slidably receives a controlling piston 16, integral with a push rod 18 normally connected to the brake pedal of the vehicle, and a floating piston 20. A first pressure chamber 22 is defined between the two piston 16 and 20, and the second pressure chamber 24 is defined between the floating piston and the end of the bore 14.

A first outlet orifice 26 enables the first chamber 22 to be connected to a first set of brakes 28 associated, for example, with the rear wheels 30 of the motor vehicle. Similarly, a second outlet orifice 32 enables the second chamber 24 to be connected to a second set of brake actuators 34 associated with the front wheels 36 of the vehicle. Between the orifice 26 and the first actuator set 28 there is a conventional braking correcting valve 38. These valves for correcting the braking pressure, which are well known in the automobile braking art, can make the law of pressure rise in the brake actuator set associated therewith depart from the law of pressure rise in the first pressure chamber. For example, some correcting valves limit the pressure in the brake actuators to a predetermined value, which may be subject to the load distribution conditions in the motor vehicle. Other correcting valves, beyond a predetermined value make the pressure in the actuators rise proportionately but less than that in the chamber in the master cylinder. These correcting valves will not be described in detail here.

A by-pass valve 40 is arranged in parallel with the correcting valve. To save space, the housing of the valve 40 is integrally cast with the master cylinder housing 12. The valve 40 contains an intake chamber 42 and an escape chamber 44. The chamber 44 is directly connected by an orifice 46 to the first set of brake actuators 28. The chamber 42, however, communicates both with an inlet orifice 48, which is linked by a pipe 50 to the orifice 26, and with an orifice 52 connected directly to the inlet orifice of the correcting valve 38. Between the two chambers 42 and 44 there lies a valve seat 54, which extends in a plane substantially perpendicular to the axis of the bore 14, and whose effective area is greater than that of an orifice 56 coaxial with the bore 14 and extending from the end of this bore. A valve member 58 is biased into fluid-tight contact with its seat by a weak spring 60. The valve member 58 is capable of cooperating with the floating piston by means of a mechanical transmission defined by a tappet 62, which is integral with the valve member and projects through the orifice 56 in a fluid-tight manner. The rod 62 cooperates with the valve member by way of that face adjacent to the escape chamber 44 of the by-pass valve. Its free end is capable of making contact with the end 64 of the floating piston 20 when the latter moves to the left in the FIGURE.

The by-pass valve excepted the other components of the tandem master cylinder are well known in the braking art and will not be described in detail. In addition to the conventional components shown in the FIGURE, the master cylinder comprises compensating and auxiliary ports appropriately arranged in its housing and connected in a conventional manner to a fluid reservoir (not shown).

The dual vehicle brake circuit just described operates as follows.

Let us assume first that both brake circuits are operating correctly. When braking begins, the correcting valve 38 is open. In this case the pressures acting on the valve member 58 balance one another, and this member is held on its seat by its spring 60. After the correcting valve 38 has closed, the pressure prevailing in the escape chamber 44 is less than that prevailing in the intake chamber 42. A differential pressure is therefore added to the force of the spring 60 urging the valve member 58 into fluid-tight contact with its seat 54.

If the brake circuit associated with the brake actuator set 34 is faulty, the depression of the brake pedal by the driver urges the two pistons 16 and 20 towards the end of the bore 14, and the end 64 of the piston 20 operates the tappet 62, so detaching the valve member from its seat and opening the by-pass valve.

What is claimed is:

1. A tandem master cylinder for a split braking circuit, comprising a housing containing a principal bore, said bore receiving a controlling piston and a floating piston to define therein a first chamber and a second chamber between the floating piston and the end of the bore, said first chamber communicating with a first outlet adapted to be connected through a correcting valve to a first set of brake actuators, said second chamber communicating with a second outlet adapted to be connected to a second set of brake actuators, a bypass valve in said housing located between said first outlet and a third outlet adapted to be connected directly to said first set of brake actuators, said bypass valve including a valve member biased into its closed position by a spring, said valve member being integral with a tappet passing through the end of the principal bore and projecting into the second pressure chamber, said floating piston and said control piston initially sliding in said principal bore in response to each operator input force to develop a first fluid pressure force in said first chamber and a second fluid pressure in said second chamber, said first fluid pressure acting on said bypass valve to hold said valve member in said closed position, said floating piston and said control piston further moving in said principal bore in response to an operator input force when a predetermined fluid pressure differential develops in said principal bore between said first fluid pressure and said second fluid pressure to permit said floating piston to directly engage said tappet and urge said valve member into an opened position to allow free communication from said first chamber through said third outlet to allow said first fluid pressure to operate the first set of brake actuators without being modified by said correcting valve.

2. A tandem master cylinder as claimed in claim 1, wherein the master cylinder housing contains an intake chamber communicating directly with the first pressure chamber and an escape chamber, both intake and escape chambers being separated by the seat of the bypass valve, said seat being perpendicular to the axis of the principal bore and having an effective cross section greater than that of the tappet, the valve member cooperating with the tappet by way of its face adjacent to the escape chamber.

* * * * *